United States Patent [19]
Richied et al.

[11] Patent Number: 5,853,198
[45] Date of Patent: Dec. 29, 1998

[54] THERMAL ATTACHMENT DEVICE

[75] Inventors: Donald E. Richied, Maple Park; Anne M. Stecher, Marengo, both of Ill.

[73] Assignee: Illinois Superconductor Corporation, Mt. Prospect, Ill.

[21] Appl. No.: 852,313

[22] Filed: May 7, 1997

[51] Int. Cl.[6] ..................................................... F16L 53/00
[52] U.S. Cl. ........................... 285/41; 285/187; 285/322; 285/904; 285/905; 285/328; 285/55
[58] Field of Search ..................................... 285/904, 308, 285/322, 55, 187, 328, 381.3, 381.5, 905, 41, 323, 381.1; 403/28, 29, 30; 29/447

[56] References Cited

U.S. PATENT DOCUMENTS

| | | | |
|---|---|---|---|
| 351,263 | 10/1886 | Hemphill | 285/381.1 |
| 3,507,522 | 4/1970 | Froman et al. | 285/187 |
| 3,807,772 | 4/1974 | Delisle et al. | 285/41 |
| 5,620,187 | 4/1997 | Jia | 285/904 X |

*Primary Examiner*—Dave W. Arola
*Attorney, Agent, or Firm*—Michael D. Rechtin; Foley & Lardner

[57] ABSTRACT

A mechanical coupling device for selectively connecting and disconnecting an apparatus to a thermal source. The coupling device includes a thermal bridge element comprised of a flexible structure having a first coefficient of thermal expansion, and a thermal stress element disposed about the thermal bridge element with the thermal stress element having a second coefficient of thermal expansion. The difference in coefficients of thermal expansion act to cause stressing of the thermal bridge element into thermal contact with the apparatus.

20 Claims, 3 Drawing Sheets

THERMAL ATTACHMENT DEVICE

BACKGROUND OF THE INVENTION

The present invention relates generally to a mechanical coupling device for selectively connecting and disconnecting an apparatus to a thermal source. More particularly, the invention is directed to a mechanical coupling device for connecting and disconnecting an apparatus to a cryogenic cooling source.

A variety of equipment operational states need a mechanical coupling between a thermal source, such as a cryogenic cooling device, and an apparatus to be cooled. It is conventional to effectuate such a mechanical coupling by use of threaded mechanical fittings accessible to the person completing the task. However, such accessibility can be a problem when dealing with apparatus having a vacuum chamber within which a thermal or cryogenic coupling is to be made. In such instances it is preferable to selectively connect and disconnect to the apparatus to be cooled without opening the vacuum system. Similarly, other situations would benefit from making thermal attachments without having to thermally cycle a system (which can lead to materials breakdown) or without the need of accessing a closed or inhospitable environment or other environment not conveniently accessed or requiring interaction with potentially dangerous equipment.

It is therefore an object of the invention to provide an improved thermal attachment device.

It is another object of the invention to provide a novel clamping device for coupling a cryogenic cooling source to a device to be cooled.

It is a further object of the invention to provide an improved thermal attachment device enabling coupling of a thermal source to an apparatus without use of threaded fasteners.

It is also an object of the invention to provide a novel cryogenic coupling device enabling connection of a cryogenic source to an enclosed apparatus without opening an enclosure around the apparatus.

It is an additional object of the invention to provide an improved mechanical coupling device using a cryogenic thermal bridge element made of a flexible structure and having a first coefficient of thermal expansion and a thermal stress element having a coefficient of thermal expansion larger than the first coefficient and disposed circumferentially about and in thermal contact with the cryogenic thermal bridge element.

It is yet another object of the invention to provide a novel thermal attachment device using a flexible thermal bridge element having a first coefficient of thermal expansion and a thermal stress element adjacent to the thermal bridge element and having a coefficient of thermal expansion different than the first coefficient such that, when a thermal source establishes heating or cooling of the bridge element, the thermal stress element causes flexure of the thermal bridge element into contact with an apparatus to be cooled or heated.

It is also another object of the invention to provide an improved cryogenic coupling device for selectively connecting and disconnecting an apparatus to a cryogenic cooling source using a copper thermal bridge element having a flexible nose portion and a thermal stress ring disposed around the copper flexible nose portion such that the stress ring has a larger coefficient of thermal expansion than the copper nose portion, thereby causing hoop stresses to be generated upon cooling and cause flexing of the nose portion into thermal contact with the apparatus.

It is yet a further object of the invention to provide a novel thermal coupling system for selectively increasing and decreasing the level of mechanical coupling between one device and another by virtue of different thermal expansion coefficients of a flexible nose element and a thermal stress ring disposed about the nose element.

Other advantages and details of operation of the invention will become apparent from the following detailed description and claims and the drawings described hereinbelow.

DETAILED DESCRIPTION OF THE PREFERRED EMBODIMENTS

Figure 1:
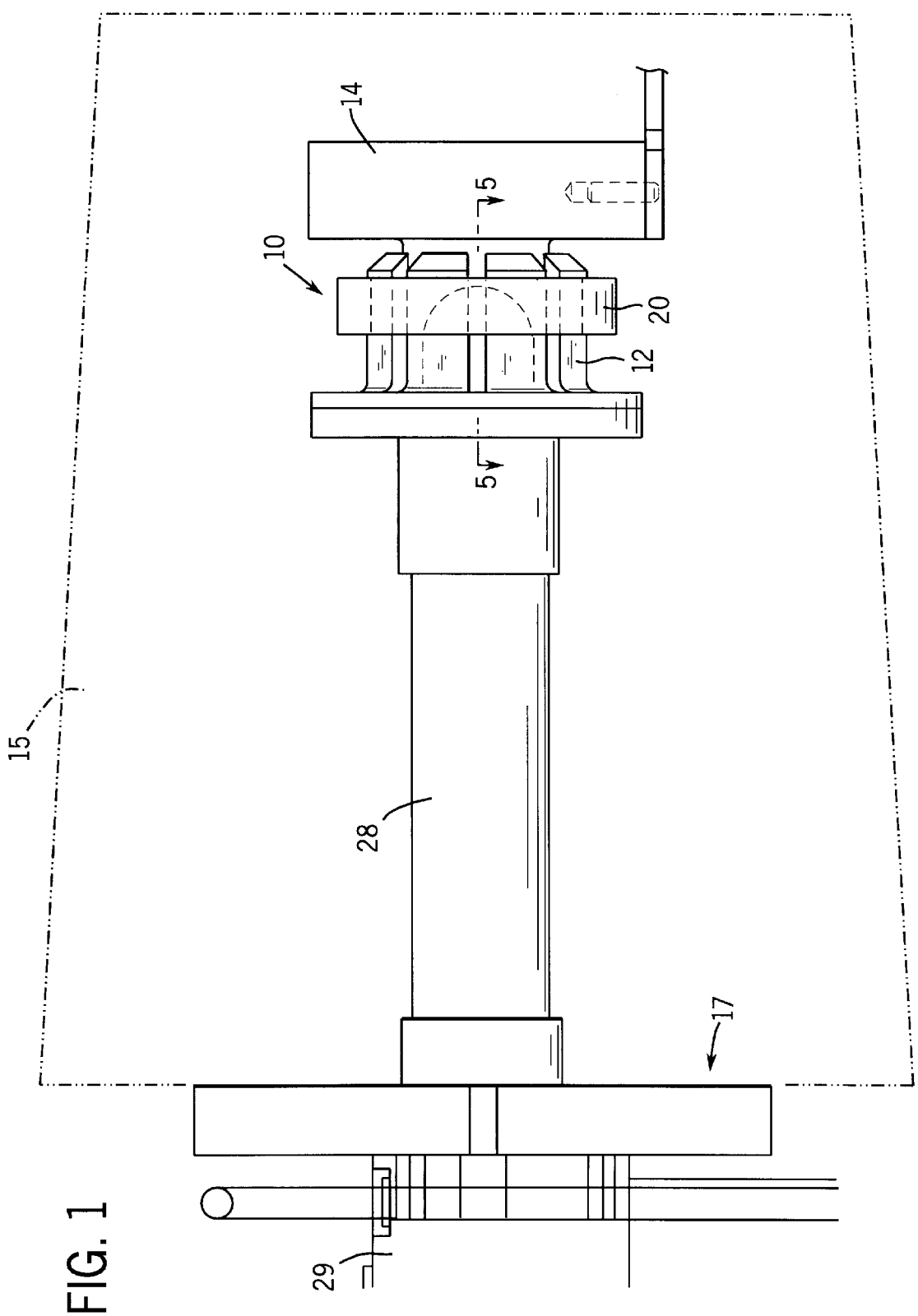
FIG. 1 illustrates a thermal coupling system constructed in accordance with the invention.
Figure 2:
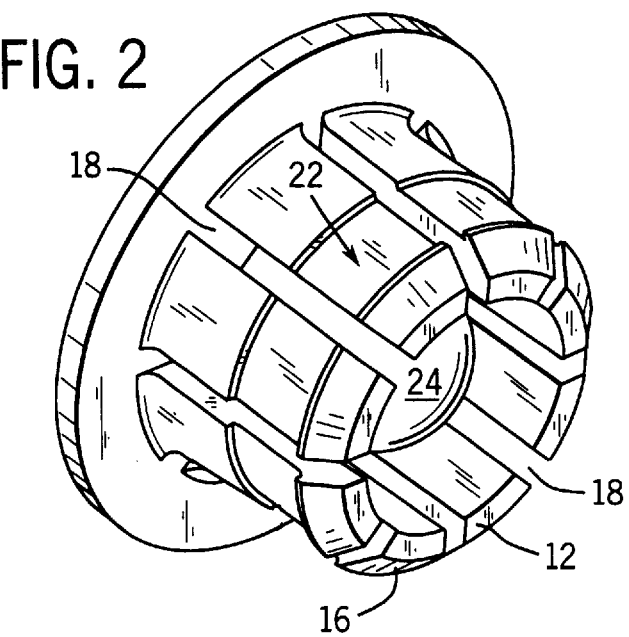
FIG. 2 illustrates a thermal bridge element forming part of a thermal coupling device constructed in accordance with the invention.
Figure 3:
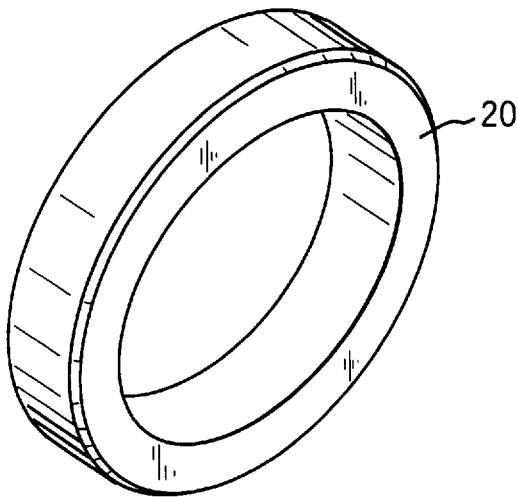
FIG. 3 illustrates a stress element forming part of a thermal coupling device.
Figure 4:
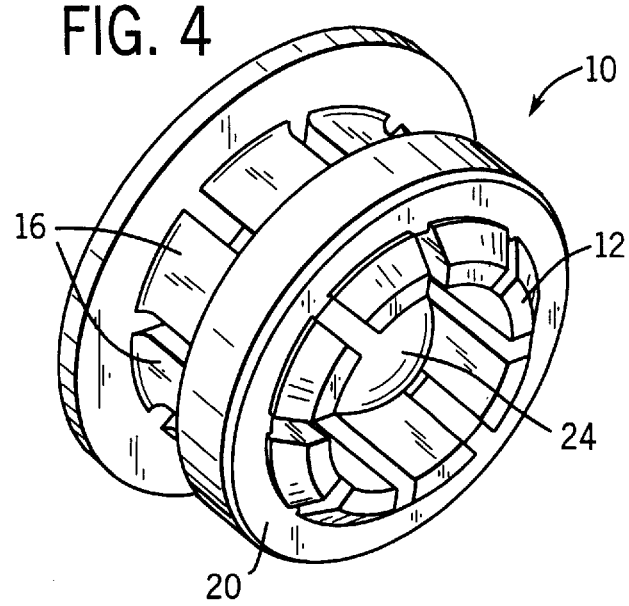
FIG. 4 illustrates a thermal coupling device formed from the elements of FIGS. 2 and 3.

Referring now to the figures and more particularly to FIG. 1, a thermal coupling device, in particular a cryogenic coupling device, constructed in accordance with the invention is generally shown at 10. The thermal coupling device 10 is further shown in FIGS. 2–4 in terms of its components, one of which includes a cryogenic bridge element 12 having a first coefficient of thermal expansion with the cryogenic bridge element 12 disposed apart from an apparatus 14 to be cooled (see FIG. 5). The apparatus 14 can be any of a wide variety of systems, such as an RF filter containing high temperature superconductor components, computer devices requiring cryogenic operating temperatures, electronic systems and radiation systems. In general the coupling device 10 is disposed within an environment 15 which is inaccessible for a variety of possible reasons, such as wanting to maintain a vacuum around the cryogenically cooled apparatus 14. Thus, the coupling device 10 is disposed through a vacuum port 17 for coupling to the apparatus 14.

Figure 5:
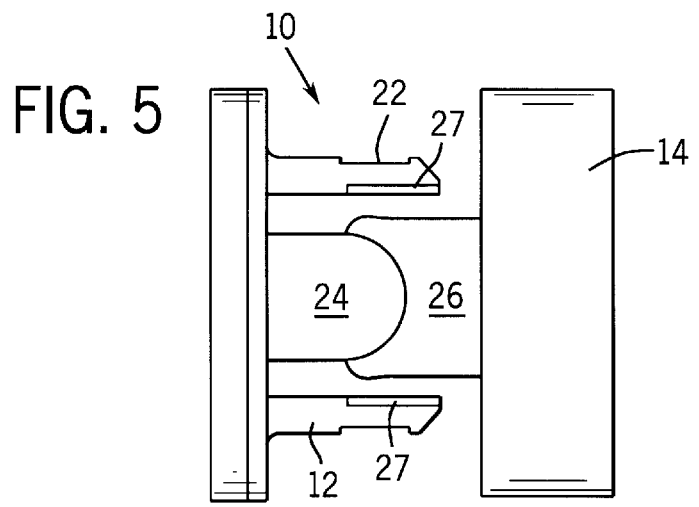
FIG. 5 illustrates a cross section along 5—5 in FIG. 1.

As can be seen by reference to FIGS. 2–5, the cryogenic bridge element 12 has a flexible structure comprised of longitudinal segments 16 with gaps 18 circumferentially disposed. This arrangement allows the segments 16 to be flexed by use of a thermal stress element 20 (see FIG. 3) disposed circumferentially about the cryogenic bridge element 12 and positioned within recess channel 22 (see FIGS. 2 and 5). This thermal stress element 20 has a second coefficient of thermal expansion larger than the first coefficient of thermal expansion of the bridge element 12. When the bridge element 12 is cooled (as described hereinafter) this difference in expansion coefficients causes the thermal stress element 20 to shrink more than the bridge element 12 and cause increased thermal contact with the apparatus 14. As can be seen in FIG. 5, the cryogenic bridge element 12 further includes a protruding probe 24 which is designed to receive a mating structure 26 coupled to the apparatus 14 to be cooled. Therefore, the thermal stress element 20 forces the bridge element 12 into better thermal contact with the protruding probe 24 and the mating structure 26 which is thermally coupled to the apparatus 14.

The cryogenic bridge element 12 can also be modified to improve the increased thermal coupling to the apparatus 14 by providing a patterned or coated surface 27 (see FIG. 5) on at least a portion of the element 12 and/or the protruding probe 24 and the mating structure 26.

In the embodiment of FIG. 1 a cryogenic cooling source head 28 provides a conduit to cool the apparatus 14. Consequently, when a cryogenic cooling source 29 establishes a cryogenic heat sink, a thermal gradient is then formed along the cooling source head 28. The coupling device 10 thus decreases in temperature, and the thermal stress element 20 and the bridge element 12 undergo different degrees of thermal contraction as described above. Once the coupling device 10 accomplishes thermal contact between the cooing source 28 and the apparatus 14, cooling takes place until the cooling source 28 is effectively removed from the thermal circuit (for example, the cryogen has boiled off or the cryostat has been removed). When the coupling device 10 warms, the thermal stress element 20 expands at a greater rate than the bridge element 12 which causes physical separation of the bridge element 12 with the apparatus 14; and thus thermal contact is broken between the coupling device 10 and the apparatus 14.

The above described structural arrangement can be used with many combinations of materials, such as teflon (a trademark of DuPont Corp.) or nylon for the thermal stress element 20 and a copper based material, such as beryllium copper (ASTMB197) for the thermal bridge element 12. In Table I are shown examples of linear thermal expansion coefficient for a variety of plastics which can be used for the thermal stress element 20. Of course, any material (metal, plastic and composites, for example) with an appropriately large expansion coefficient can be used. These coefficients can be compared to copper which has a thermal expansion coefficient of about $14 \times 10^{-6}$. Other metals (plastics or composites) can, of course, be used in place of copper, but the relative differences between coefficient of expansion for the stress element 20 and the bridge element 12 must be adequate to effectuate good thermal contact between the coupling device 10 and the apparatus 14.

The above described coupling device 10 can advantageously be used to selectively connect and disconnect an apparatus to a thermal source, such as a cryogenic source described hereinbefore, without requiring direct access to the thermal coupling mechanism. This structure therefore allows thermal cycling of such a connection without disturbing an environment in place for, or necessary for operation of, the apparatus 14. Examples of use are high vacuum environments, a clean environment which must be maintained, inhospitable environments or dangerous systems, such as a high voltage or radiation field environment. In an example of a high vacuum chamber for the environment 15 shown in FIG. 1, the coupling device 10 is enclosed by the environment 15 which is in fact generally welded shut, making access possible only through the port 17.

Figure 6:
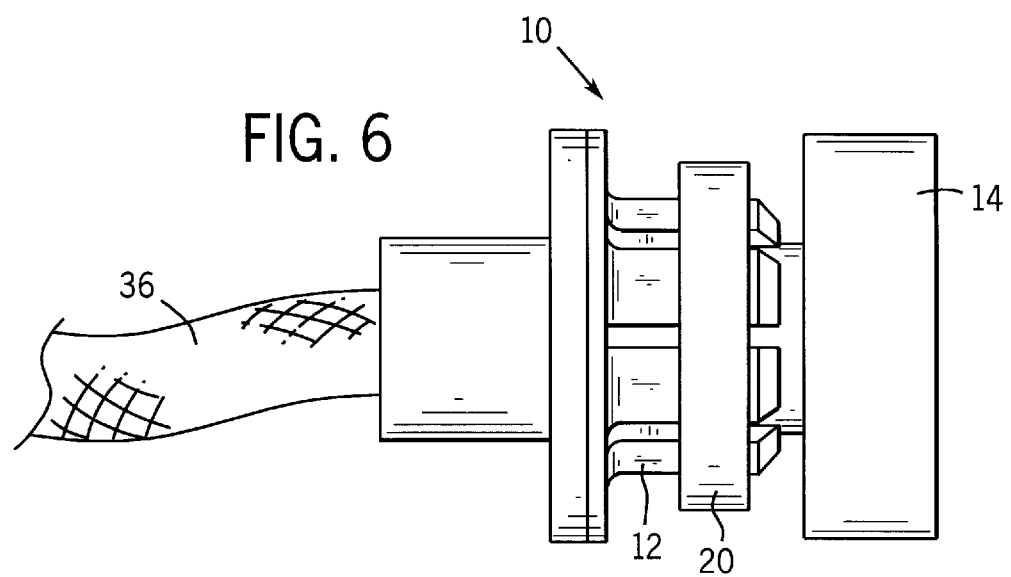
FIG. 6 illustrates another form of thermal coupling system.

In another embodiment shown in FIG. 6 the coupling device 10 can be movable to engage the apparatus 12 by use of a flexible coupling, such as braid or a flexible bellows 36. In yet another form of the coupling device 10, the bridge element 12 can be integrally coupled to the apparatus 14 rather than be part of the coupling device 10 as shown in FIG. 1. Further, the arrangements of the protruding probe 24 and the mating structure 26 can also be changed to carry out the intended purpose of the invention, as would be understood by one of ordinary skill in the art.

In yet another form of the invention, the thermal source can be a hot source rather than a cryogenic source; and the relative coefficients of thermal expansion of the bridge element 12 and the stress element 20 will be reversed compared to a cryogenic thermal source.

While preferred embodiments have been illustrated and described, it should be understood that changes and modifications can be made therein without departing form the invention in its broader aspects. Various features of the invention are set forth in the appended claims.

What is claimed is:

1. A mechanical coupling device for selectively connecting and disconnecting an apparatus to a cryogenic cooling source, comprising:

a cryogenic thermal bridge element coolable by the cryogenic cooling source and comprised of a flexible structure having a first coefficient of thermal expansion, said cryogenic thermal bridge element disposed apart from said apparatus until cooled by the cryogenic cooling source; and a thermal stress element disposed circumferentially about and in thermal contact with said cryogenic thermal bridge element and said thermal stress element having a second coefficient of thermal expansion larger than said first coefficient of thermal expansion, thereby enabling said thermal element to cause hoop stresses and preferential flexing of said cryogenic thermal bridge element into thermal contact with the apparatus when the cryogenic cooling source establishes cooling of said cryogenic thermal bridge element.

2. The mechanical coupling device as defined in claim 1 wherein said cryogenic thermal bridge element comprises a metal.

3. The mechanical coupling device as defined in claim 2 wherein said thermal stress element comprises a plastic.

4. The mechanical coupling device as defined in claim 1 further including a patterned surface for at least a portion of said cryogenic thermal bridge element, thereby enhancing thermal conductivity between said thermal bridge element and said apparatus.

5. The mechanical coupling device as defined in claim 1 further including a coating applied to at least a portion of said cryogenic thermal bridge element, thereby enhancing thermal conductivity between said thermal bridge element and said apparatus.

6. The mechanical coupling device as defined in claim 1 further including a cryogenic cooling source head for coupling the cryogenic cooling source to said cryogenic thermal bridge element.

7. The mechanical coupling device as defined in claim 1 wherein said apparatus comprises an RF filter.

8. The mechanical coupling device as defined in claim 1 wherein said apparatus comprises a computer.

9. The mechanical coupling device as defined in claim 1 wherein said apparatus comprises an electronic system.

10. The mechanical coupling device as defined in claim 1 wherein said apparatus comprises a radiation system.

11. A mechanical coupling device for selectively connecting and disconnecting an apparatus to a thermal source, comprising:

a thermal bridge element which can have a thermal source coupled thereto and comprised of a flexible structure having a first coefficient of thermal expansion, said thermal bridge element disposed apart from said apparatus until its temperature is changed by the thermal source; and a thermal stress element disposed circumferentially about and in thermal contact with said thermal bridge element and said thermal stress element having a second coefficient of thermal expansion appropriately different than said first coefficient of thermal expansion, thereby enabling said thermal element to cause hoop stresses and preferential flexing of said thermal bridge element into good thermal contact with the apparatus when the thermal source establishes a change of temperature of said thermal bridge element.

12. The mechanical coupling device as defined in claim 11 wherein said thermal bridge element comprises a metal.

13. The mechanical coupling device as defined in claim 12 wherein said thermal stress element comprises a plastic.

14. The mechanical coupling device as defined in claim 11 further including a patterned surface for at least a portion of said thermal bridge element, thereby enhancing thermal conductivity between said thermal bridge element and said apparatus.

15. The mechanical coupling device as defined in claim 11 further including a coating applied to at least a portion of said thermal bridge element, thereby enhancing thermal conductivity between said thermal bridge element and said apparatus.

16. The mechanical coupling device as defined in claim 11 further including a thermal source head for coupling the thermal source to said thermal bridge element.

17. The mechanical coupling device as defined in claim 11 wherein said apparatus comprises an RF filter.

18. The mechanical coupling device as defined in claim 11 wherein said apparatus comprises a computer.

19. The mechanical coupling device as defined in claim 11 wherein said apparatus comprises an electronic system.

20. The mechanical coupling device as defined in claim 11 wherein said apparatus comprises a radiation system.

* * * * *